United States Patent [19]
Pinomaki

[11] 3,889,729
[45] June 17, 1975

[54] TREE HARVESTING MACHINE

[76] Inventor: Skari E. Pinomaki, 39160 Julkujarvi, Finland

[22] Filed: Nov. 8, 1973

[21] Appl. No.: 413,981

[30] Foreign Application Priority Data
Nov. 9, 1972 Finland .............................. 3125/72

[52] U.S. Cl. ............ 144/3 D; 144/2 Z; 144/309 AC
[51] Int. Cl. .............................................. B27c 9/00
[58] Field of Search .... 144/2 Z, 3 D, 34 R, 309 AC

[56] References Cited
UNITED STATES PATENTS

| | | | |
|---|---|---|---|
| 2,948,311 | 8/1960 | McCollum | 144/2 Z X |
| 3,371,692 | 3/1968 | Larson et al. | 144/2 Z X |
| 3,443,611 | 5/1969 | Jorgensen | 144/2 Z |
| 3,498,350 | 3/1970 | Maradyn | 144/2 Z X |
| 3,542,099 | 11/1970 | Gibson | 144/3 D |
| 3,618,647 | 11/1971 | Stuart, Jr. | 144/3 D X |
| 3,623,521 | 11/1971 | Shields | 144/3 D X |
| 3,643,711 | 2/1972 | Puna | 144/3 D X |
| 3,734,152 | 5/1973 | Shields | 144/2 Z X |

*Primary Examiner*—J. M. Meister
*Assistant Examiner*—W. D. Bray
*Attorney, Agent, or Firm*—Tab T. Thein

[57] ABSTRACT

Tree harvesting machine, for felling and delimbing trees, cutting them into logs of fixed lengths, assorting and stacking the resulting logs, which machine comprises a slidable and tiltable lifting boom, and a tiltable and pivotable working boom articulated to one end of the lifting boom, various gripping and cutting tools, including a conventional slidable, first delimbing attachment on the working boom, and a novel stationary, second delimbing attachment which can optionally be provided at the free end of the lifting or of the working boom.

10 Claims, 9 Drawing Figures

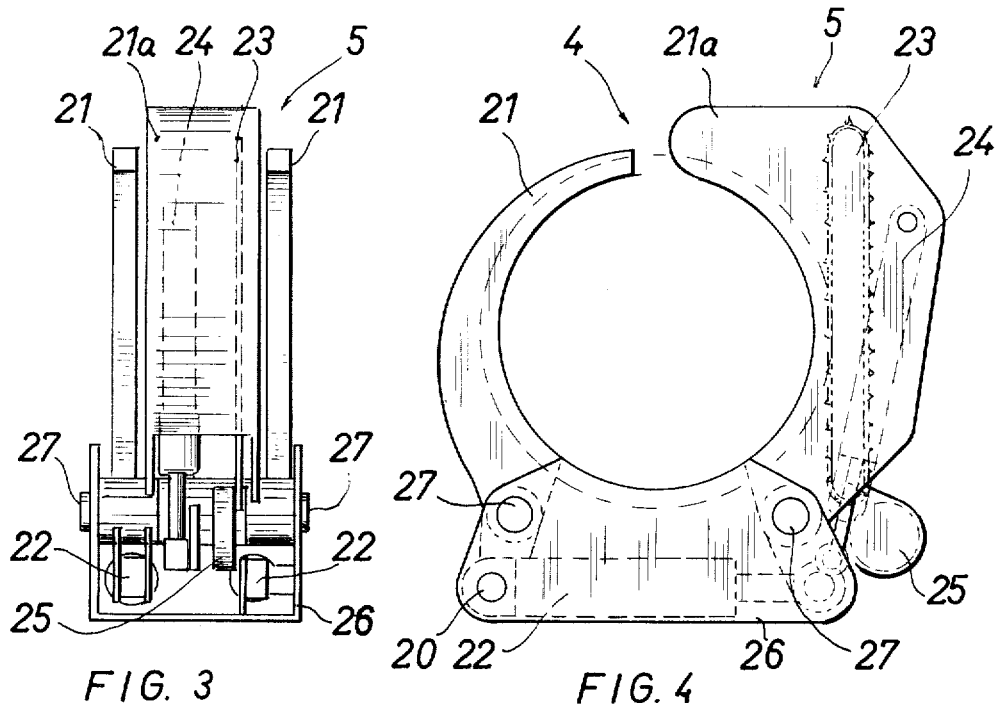
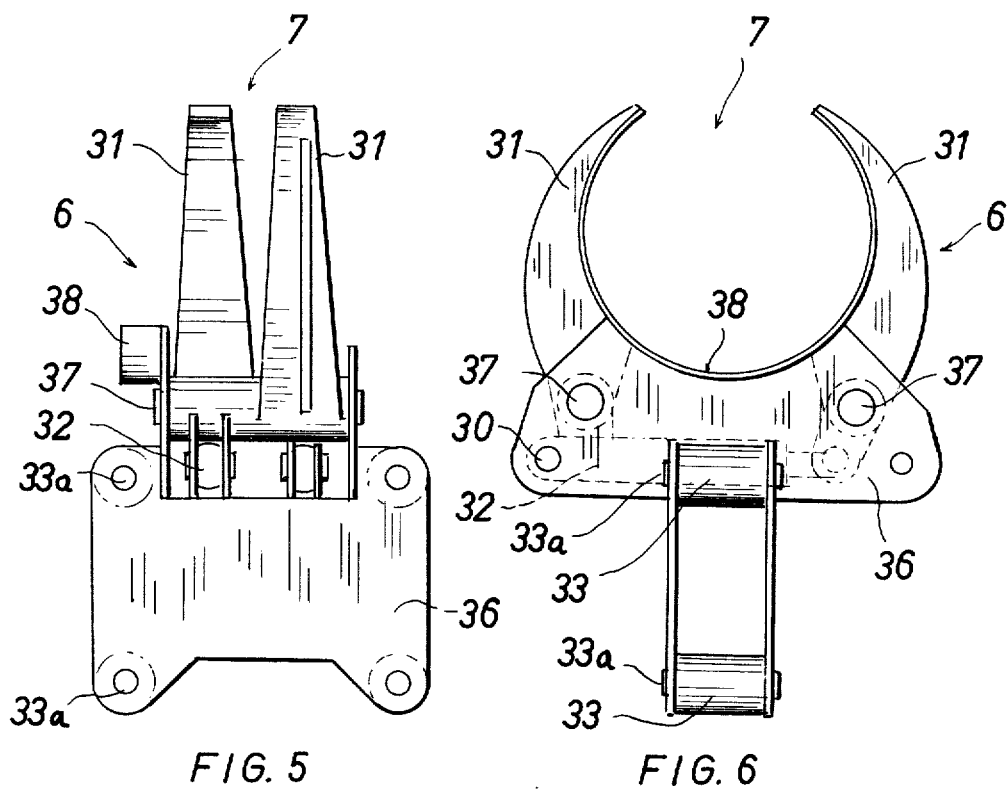

TREE HARVESTING MACHINE

The invention relates to a harvesting machine for felling, delimbing, cutting into logs, assorting and stacking trees and the resulting logs.

There are already known harvesting machines for erect trees, which machines are provided with a mechanically or hydraulically driven lifting boom mounted on a vehicle or carriage, capable of moving over rough ground such as in a forest, and on which boom there is mounted a second, so-called working boom which supports and guides working tools, namely for felling, cutting off and delimbing the trees, while the second boom is maneuverable to be set into close contact with the tree for felling and delimbing the same, cutting the branches into logs of fixed lengths, as well as for assorting and stacking the logs.

The known machines are provided with jaws or similar means mounted on the front part of the working boom, and close to the jaws there is also mounted a mechanically driven cutting tool, e.g. a circular saw, or corresponding means for cutting off the tree. On the second or working boom there is also mounted a delimbing attachment movably arranged on guides along the boom, and being further provided with gripping jaws holding on to the tree. The delimbing attachment is adapted to make a working movement along the guides, beginning from the front part of the boom, where the jaws, close to the cutting tool, hold the lower part of the tree.

This movement continues up to the other end of the guides, whereafter the delimbing attachment stops for a while and its gripping jaws then grip the tree, while the attachment stops for a backwards movement, thus feeding the partly delimbed tree toward the front part of the working boom. When the attachment has reached the front part of the boom, the already delimbed part projects from the working boom. Then the cutting-off attachment starts and cuts off the delimbed part of the tree. Thereafter the delimbing attachment makes a second delimbing movement and feeds the tree backward, namely for a new cutting-off operation.

These movements and working operations are repeated until the tree is totally delimbed and cut into logs of fixed lengths. The lengths of the movements are of course adjustable so that required lengths can be obtained. The working boom is now swung into an upright position, close to the standing tree during the felling operation and after the base of the tree is cut off. The boom is then swung into a horizontal position together with the tree being held by the jaws, near the cutting-off attachment, and eventually the delimbing as well as the cutting into logs are performed while the boom is in this horizontal position.

The known constructions have the defect that the most part of the limbs fall close to the working boom, and partly even on the boom itself, where some limbs can get into or in contact with the guides, tools or holding jaws, thus causing trouble with the functions of the machine. The cutting-off of the tree top and the delimbing of the preceding part require an additional operation which is somewhat troublesome and slow.

The general object of the present invention resides in the provision of a new and improved tree harvesting machine by which the explained defects are eliminated.

The inventive tree harvesting machine comprises a slidable and tiltable lifting boom, and a tiltable and pivotable working boom articulated to one end of the lifting boom, various gripping and cutting tools, including a conventional slidable, first delimbing attachment on the working boom, and a novel stationary, second delimbing attachment which can optionally be provided at the free end of the lifting or of the working boom.

According to further features of the invention, means are provided for gripping the tree, with a cutting-off tool, in operative connection with the working boom, and preferably mounted on an articulation interposed between the lifting and the working booms of the machine.

The invention provides specific structural measures for parts of the gripping and cutting-off attachment and of the two delimbing attachments forming part of the machine, one of the two latter being movable while the other is stationary with respect to the associated boom.

The machine also comprises a driving machinery, preferably of the hydraulic type, including various actuators for selectively operating the sliding, tilting and pivoting movements of the two booms, and for selectively opening and closing the gripping tools, reciprocating a carriage of the first delimbing attachment, and/or other operations of the machine.

Other objects and many of the attendant advantages of the invention will be readily appreciated as the same becomes better understood by reference to the following detailed description, when considered with the accompanying drawings, wherein FIG. 1 is a side view of a preferred embodiment of a tree harvesting machine according to the invention, mounted on a vehicle (without a tree being shown in use, as in FIGS. 2 and 9, but including a modification as will be explained for FIG. 9);

FIG. 2 is a partial side view of the same machine but showing the same in a working position, together with a tree (but without the modification), the left- and right-hand sides being reversed with respect to FIG. 1;

FIGS. 3 and 4 are respective side and front views of a gripping and cutting-off attachment mounted on the fore part of a working boom and shown on a much larger scale than FIGS. 1, 2 and 9 (and so are also FIGS. 5 through 8);

FIGS. 5 and 6 are side and front views of a delimbing attachment movably mounted along the working boom;

Figure 1:
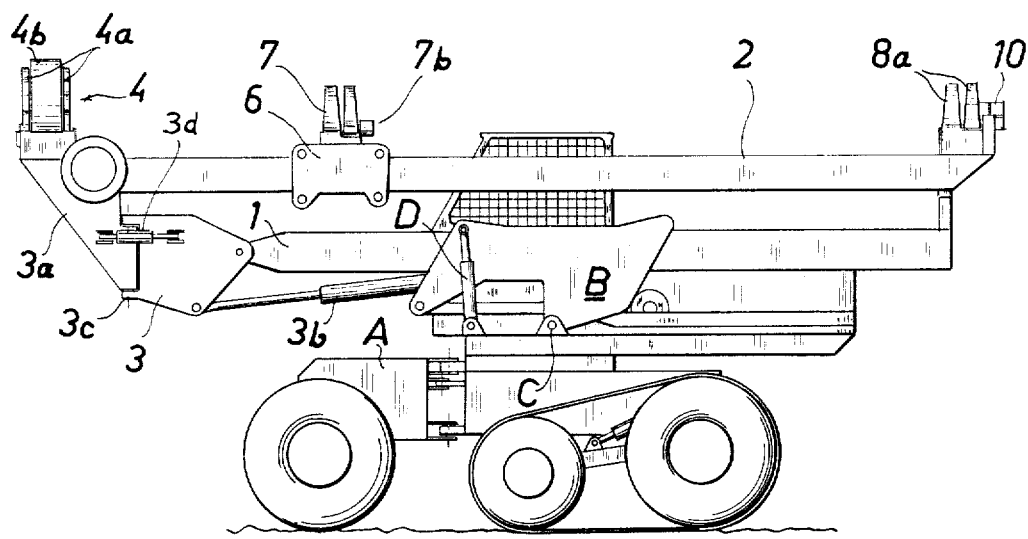
Figure 2:
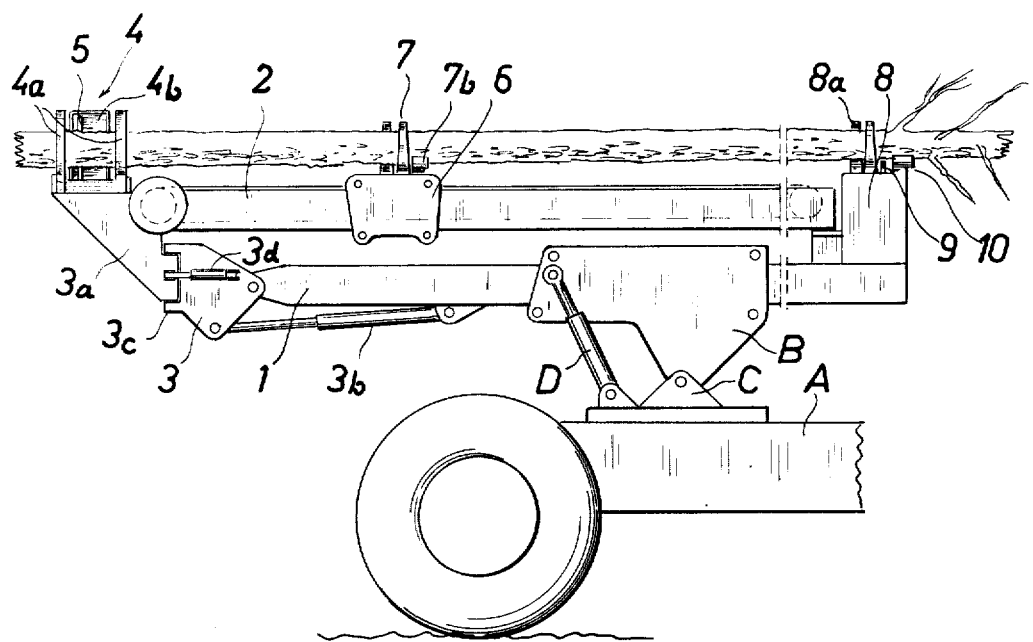
Figure 9:
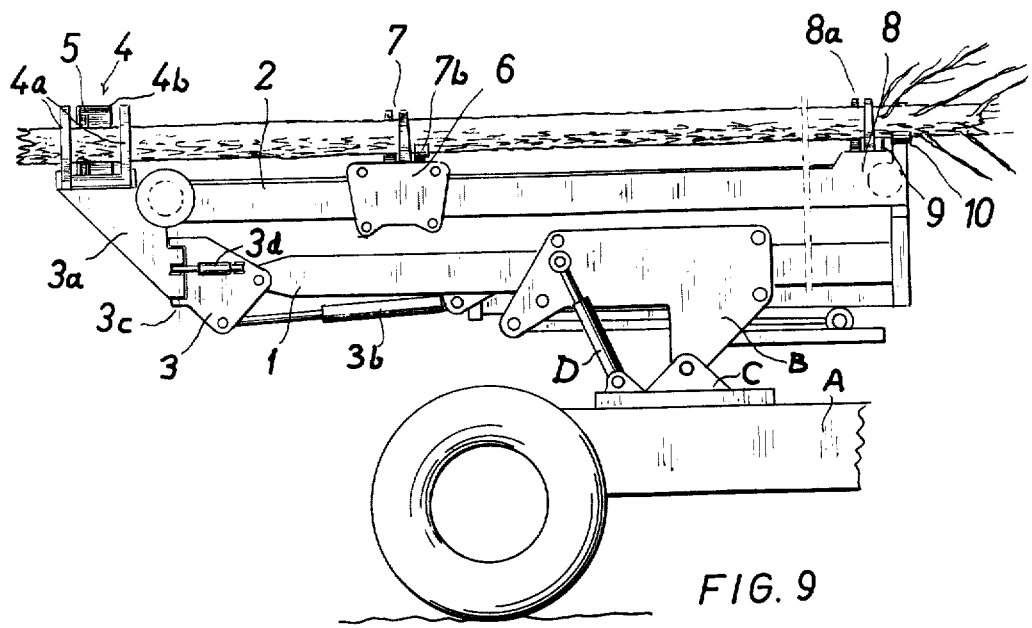
FIG. 9 shows, in a view similar to that of FIG. 2, the modification of FIG. 1, wherein a second delimbing attachment is provided at the end of the working boom (while in FIG. 2, it is attached to the end of a lifting boom).

Before starting the description of the inventive tree harvesting machine, it should be noted that FIGS. 1, 2 and 9 constitute general side views (FIG. 1 running in a direction opposite to that of FIGS. 2, 9), without all the details being shown, while respective pairs of FIGS. 3 and 4, 5 and 6 as well as 7 and 8 show the important details on a larger scale, these latter figures being properly correlated with the elements generally shown in the first-mentioned three overall views.

On the overall views, the tree harvesting machine comprises a first or lifting boom 1 which is mounted on a carriage A of a suitable vehicle (only partly shown) capable of moving over rough ground such as in a forest. Boom 1 is supported by a bracket B which can be swung around a vertical axis on swinging means C. Boom 1 can also be inclined in the vertical plane by tilting bracket B by means of a power cylinder D. Further, boom 1 can be moved longitudinally within bracket B.

On the front part of boom 1 is tiltably and pivotably mounted a second boom 2, called a working boom, by means of articulation blocks 3, 3a. The first block 3 is tiltable in the vertical plane by means of a power cylinder 3b. The second block 3a is in turn swingably attached about a vertical axis 3c by means of a power cylinder 3d. Boom 2 is mounted firmly on the rear part of second block 3a, whereby boom 2 can be maneuvered into various positions, required to catch trees within the reach of the machine.

It should be appreciated by those skilled in the prior art that "vertical" and "horizontal" in respect of this description are arbitrarily selected to denote the usual set-up of the tree harvesting machine for use on a terrain, which should however not be construed as designating a particular, e.g. strictly vertical position (which might instead be at a slight angle).

On the upper part of second block 3a there is mounted a cutting-off tool attachment 4 consisting of power-driven (preferably hydraulic) holding jaws 4a, 4b clamping around the lower part of a tree, and of a cutting-off tool 5, e.g. circular saw, a chain saw or similar. Details of these parts will be given later, for example in connection with the description of the larger-scale FIGS. 3 and 4.

On boom 2 is mounted a movable, first delimbing tool attachment or carriage 6 which is longitudinally movable along boom 2 on upper and lower guide surfaces of the boom (see FIGS. 5, 6), for rollers 33. The carriage is provided with a power drive for the longitudinal movement, as will be explained later in more detail (FIGS. 5 and 6). The delimbing attachment is also provided with two opposite power-driven jaws 7 which can be clamped around the tree with an adjustable power. Jaws 7 are also provided with cutting edges for delimbing the tree. There is also mounted supporting means 7b which is situated symmetrically between jaws 7 but in a slightly offset position relating to the longitudinal direction of the boom. Supporting means 7b is also provided with a cutting edge and serves also for delimbing the underside of the tree in addition to supporting the tree trunk.

As shown in FIG. 2, on the other (free) end of first or lifting boom 1 there is mounted a stationary, second delimbing attachment 8. Adjusting movement in the longitudinal direction is made possible. This second attachment 8 is provided with clamping jaws 8a having cutting edges for delimbing, and a tree support 10 having cutting edges for delimbing the underside of the tree. Further there is mounted a cutting-off tool 9 provided only for cutting off the top part of the tree. Details will be given later in connection with FIGS. 7 and 8, and also in regard to the modification of FIG. 9 (where the second attachment is provided on the other, namely the second or working boom 2).

The advantage which is gained by means of the second delimbing attachment, an important feature of the present invention, resides mainly in that the main part of the delimbing operations is made behind working boom 2 so that the tree limbs cannot fall on the boom nor close to it, whereby the functions of the machine become free from trouble.

Before dealing with the modification of FIG. 9, the various attachments will be described in more detail, in their preferred, specific constructional forms, such as shown in FIGS. 3, 4 for the gripping and cutting-off attachments (generally indicated by numerals 4 and 5, also including the elements 4, 4a, 4b described so far).

In these enlarged illustrations, gripping jaws 21, 21a correspond substantially to those shown e.g. in FIG. 2 at 4a, 4b, respectively); they have power cylinders 22 for acutation, connectable in a conventional manner to a driving machinery to be mentioned later. The attachment 5 is shown here in the form of a chain saw 23, having a power cylinder 24 for feeding advancement, and a motor 25 for imparting rotational movement.

A housing 26 encloses the attachments 4, 5; shafts 27 are shown therein for jaws 21, 21a. It will be noted that jaw 21a is made hollow, constituting a protective shield for saw 23, as can be seen in both figures, thus protecting the chain saw against possible damages. Finally, a pivotal suspension for cylinders 22 is schematically shown at 20.

The first delimbing attachment, generally identified by numerals 6, 7, is shown in FIGS. 5, 6. At 31, gripping jaws are shown which also act as delimbing cutters; they have power cylinders 32 for actuation, the pivots of which are identified by numeral 30. The earlier-mentioned conveyor-type rollers 33 are also shown, adapted to engage the guide surfaces of the boom 2 (the latter being omitted from these figures), with shafts 33a therefor. In a manner similar to the two preceding views, numeral 36 denotes a housing or casing for carriage 6; jaws 31 have shafts 37. While these jaws correspond to those shown at 7 (in FIGS. 1, 2, 9), a stationary delimbing cutter is now designated 38, which is the counterpart of earlier-described cutter element 7b.

Figure 7:
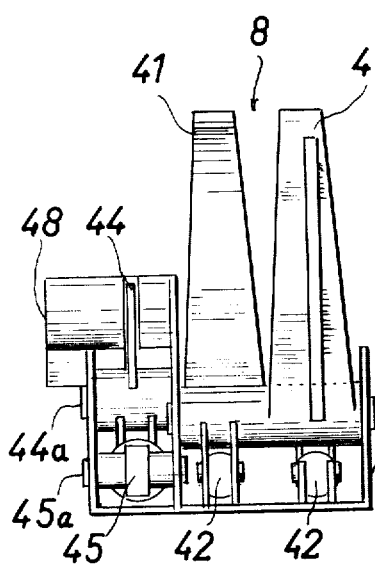
FIGS. 7 and 8 are side and front views of a delimbing and top-cutting head mounted in a stationary manner on the rear end of the working boom.
Figure 8:
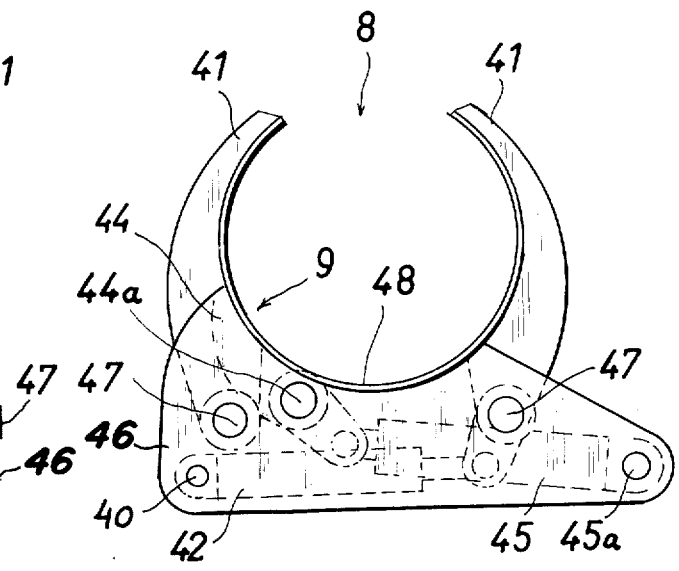

The second delimbing attachment (numerals 8, 9 in the previously described figures) is shown in FIGS. 7, 8. At 41, gripping jaws are shown (previous 8a), with actuating power cylinders 42, the pivots of the latter being shown at 40. A cutting-off or top-cutting tool 44 is the counterpart of element 9, with its shaft being shown at 44a. A power cylinder 45, having a shaft 45a, drives tool 44. A casing for the attachment 8, 9 appears at 46; shafts 47 are provided for jaws 41, as in the previous figures. Finally, a stationary delimbing cutter 48 is the counterpart of element 10.

It will be seen from the description of FIGS. 3 to 8 that all jaws are designated in a unitary group, namely by numerals 21, 31, 41; for ready identification, a similar arrangement is used for elements 20, 22, 26 and 27. These appear in all three pairs of figures while cutters 38, 48 only appear in the two latter pairs. All other numerals denote individual parts (e.g. 33, 33a; 44, 44a; etc.).

As shown in FIG. 9, the modified machine embodiment (also shown in FIG. 2) has the second delimbing attachment 8 provided at the other (free) end of second or working boom 2 (instead of boom 1). The function of the machine is similar in all other respects to that of the first described embodiment but during the first operation, when boom 2 is in the upright position, the tree is held clamped by all three attachments, namely 4 and 5 (FIGS. 3, 4), 6 and 7 (FIGS. 5, 6) as well as 8 and 9 (FIGS. 7, 8). Working boom 1 becomes of course somewhat heavier with this modified construction.

It may be added that in the embodiment of FIG. 2, working boom 2 is somewhat shorter than lifting boom 1, as shown, allowing the free end of the former to be supported, by an appropriate member, at the end of boom 1, namely when the booms are brought into a substantially parallel, coextensive position. A similar supporting feature may be provided in the modification of FIG. 9, as shown in the drawing, but the booms are here of substantially the same length.

The slight difference in the shaping of the respective terminal portions of the booms in FIG. 1, as against those of FIG. 9, does not affect the structure and operation of the machine. In the showing of FIG. 1, support is given more inwardly from the free end of upper or working boom 2. For the sake of completeness it is also mentioned that FIGS. 2 and 9 show a tree as being partly delimbed, during the operation of the inventive machine.

It will be understood that the inventive tree harvesting machine also comprises, preferably as part of the basic vehicle structure, a driving machinery, preferably of the hydraulic type, including various actuators (e.g. cylinders, piston and appropriate control means) for selectively operating the sliding and tilting movements of boom 1 with respect to the vehicle, the tilting and pivoting movements of boom 2 with respect to boom 2.

Similarly actuators and appropriate organs are contemplated, as partly shown and described, for opening and closing at least one of gripping means 4, 4a, 4b, cutting-off tool 5, first and second delimbing attachments 7, 8, for reciprocating tool carriage 6, and/or operations of the machine. The same of course applies to the jaws 21, 31, 41 which are alternative showings of 4a, 7 and 8a, respectively, and so on.

The machine according to the invention is used in the following manner. At first the machine is driven so near to the tree to be felled that it comes into the reach of lifting boom 1. Then booms 1, 2 are maneuvered so that the latter comes into an upright position, close to the tree. The movable delimbing attachment 6 is moved on guides 2a forwards, close to cutting-off attachment 5 (or 23) at the front part of boom 2. Then all jaws 4a, 4b (or 21, 21a) on attachment 5 and first delimbing attachment 6 are clamped around the tree trunk while attachment 5 is situated at the lowest position, near to ground. The cutting-off saw 23 of attachment 5 is then started.

At the same time first delimbing attachment 6 is also started and it moves then along boom 2 towards the rear end thereof. The tree limbs will thus fall on the ground and not on boom 2 becuase this is still in a vertical position during the first delimbing operation. After the tree is cut off at the lowest part, the tree trunk is then lifted by boom 2 and tilted into a horizontal position, still being clamped between the jaws of the attachments. Boom 2 can now also be swung into any desired direction around its vertical axis, as described before.

Now begins the main delimbing operation during which jaws 7 (or 31) of attachment 6 are clamped tightly around the tree and draw it towards the front part of working boom 2. By that time jaws 8a (or 41) of stationary delimbing attachment 8 act as cutting tools and remove the limbs. At the same time support 10 (or 48) acts also as a delimbing tool. Thus the tree limbs will fall behind boom 2, and cannot cause any trouble. Jaws 4 (21, 21a) are opened during this delimbing operation. When the delimbing movement has reached its end, jaws 4 are again clamped about the tree, and attachment 6 moves back towards the other end of boom 2.

It might be added at this point that for purposes of clearer definition, the boom ends towards the left-hand sides of FIGS. 2, 9 (right-hand in FIG. 1) are termed the "one" ends, while those on the other side, the "other" ends. These latter are the "free" ends of the booms.

At the same time saw 23 cuts off the part of the tree just fed. The successive delimbing and feeding movements are continued until the tree is fully delimbed and cut into logs of fixed lengths, as explained before.

With the connection of the last part one proceeds so that at the same time when the next to the last part of the tree is cut off, there is also cut the top part of the tree by means of support or tool 10 (or 48). Thereafter the last part is dropped from the machine, and similar procedures can begin with another tree.

If there were no delimbing tools 8a (41) and no cutting tools 9 (44), the last part of the tree would have to be delimbed by means of tools 7 (31) and cut by means of tool 5 (23), and in addition one would have to make a separate cut of the top part of the tree. Thus a remarkable improvement is gained by the provision of additional or "second" delimbing tools 8 and cutting-off tool 9, as fully shown in FIGS. 7 and 8 (in addition to their general illustration in the embodiments of FIGS. 2 and 9, and the initial showing of FIG. 1).

It should be understood, of course, that the foregoing disclosure relates only to preferred embodiments of the invention, and that it is intended to cover all changes and modifications of the examples described which do not constitute departures from the spirit and scope of the invention.

I claim:

1. A tree harvesting machine, for felling and delimbing trees, cutting them into logs of fixed lengths, assorting and stacking the resulting logs; comprising, in combination: a longitudinally movable lifting and moving boom tiltably mounted on a vehicle provided with a driving machinery; a working boom articulated to one end of said lifting boom, tiltably attached and pivotable about two substantially perpendicular axes; means for gripping and cutting off a tree, including a cutting-off tool mounted transversally to the longitudinal direction of said working boom, on a support fastened as the front end of said working boom, and being in operative connection with the latter; a movable, first delimbing attachment having tools,, slidable by way of a tool carriage with guides along said working boom; said delimbing tools being arranged to clamp the tree during the movement of said carriage; a stationary, second delimbing attachment having tools, attached to the other end of one of said booms; wherein said second delimbing attachment is mounted on the other end of said lifting boom, said working boom is somewhat shorter than said lifting boom, and said second delimbing attachment is actuable on the tree when said booms are in a substantially parallel position; and support means at said other end of the lifting boom for the free end of said working boom when in the substantially parallel position.

2. A tree harvesting machine, for felling and delimbing trees, cutting them into logs of fixed lengths, assorting and stacking the resulting logs; comprising, in combination: a longitudinally movable lifting and moving boom tiltably mounted on a vehicle provided with a driving machinery; a working boom articulated to one end of said lifting boom, tiltably attached and pivotable about two substantially perpendicular axes; means for gripping and cutting off a tree, including a cutting-off tool mounted transversally to the longitudinal direction of said working boom, on a support fastened at the front end of said working boom, and being in operative connection with the latter; a movable, first delimbing attachment having tools, slidable by way of a tool carriage with guides along said working boom; said delimbing tools being arranged to clamp the tree during the movement of said carriage; a stationary, second delimbing attachment having tools, attached to the other end of one of said booms; and articulation means interposed between said working boom and said lifting boom at said one end of the latter, and gripping means and said cutting-off tool being mounted on said articulation means; and wherein portions of said gripping means constitute a shield for at least part of said cutting-off tool, which is at least partly lodged therein.

3. The tree harvesting machine as defined in claim 2, further comprising a second cutting-off tool on said second delimbing attachment.

4. The tree harvesting machine as defined in claim 2, wherein said tools of the second delimbing attachment are formed as clamping jaws.

5. The tree harvesting machine as defined in claim 2, further comprising a tree support, also acting as a cutting tool, on said second delimbing attachment.

6. The tree harvesting machine as defined in claim 2, wherein said second delimbing attachment is mounted on the other end of said lifting boom, said working boom is somewhat shorter than said lifting boom, and said second delimbing attachment is actuable on the tree when said booms are in a substantially parallel position.

7. The tree harvesting machine as defined in claim 2, wherein said second delimbing attachment is attached to the free end of said working boom.

8. The tree harvesting machine as defined in claim 2, further comprising means for adjusting said second delimbing attachment longitudinally on said one boom.

9. The tree harvesting machine as defined in claim 2, wherein said driving machinery includes hydraulic actuators for selectively controlling at least one of the respective sliding, tilting and pivoting movements of said lifting and with said working booms, the former with respect to said vehicle, and the latter with respect to the former.

10. The tree harvesting machine as defined in claim 2, wherein said driving machinery includes hydraulic actuators for selectively opening and closing at least one of said gripping means, said cutting-off tool, said first and said second delimbing attachments, and for reciprocating said tool carriage.

* * * * *

UNITED STATES PATENT OFFICE
CERTIFICATE OF CORRECTION

PATENT NO. 3,889,729

DATED : June 17, 1975

INVENTOR(S) : S. E. Pinomaki

It is certified that error appears in the above-identified patent and that said Letters Patent are hereby corrected as shown below:

Claim 1, line 11 (column 6, line 48), change "as" to read -- at --; line 14 (col. 6, l. 51), change "tools," to -- tool, --;

claim 2, line 21 (col. 7, l. 17), change "and" to -- said --; and claim 9, line 5 (col. 8, l. 20), cancel "with", at the first occurrence.

Signed and Sealed this sixteenth Day of September 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,889,729            Dated June 17, 1975

Inventor(s)   Sakari E. Pinomaki

It is certified that error appears in the above-identified patent and that said Letters Patent are hereby corrected as shown below:

Inventor's name should read -- Skari E. Pinomaki --.

Signed and Sealed this fourteenth Day of October 1975

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,889,729     Dated June 17, 1975

Inventor(s) Sakari E. Pinomaki

It is certified that error appears in the above-identified patent and that said Letters Patent are hereby corrected as shown below:

Item "[76]" should read -- Sakari E. Pinomaki --.

Column 6, line 48, "as" should read -- at --; line 51, "tools,," should read -- tools, --. Column 7, line 17, "and" should read -- said --. Column 8, line 20, cancel "with", first occurrence.

This certificate supersedes Certificate of Correction issued Sept. 16, 1975 and Oct. 14, 1975.

Signed and Sealed this thirtieth Day of December 1975

[SEAL]

Attest:

RUTH C. MASON
Attesting Officer

C. MARSHALL DANN
Commissioner of Patents and Trademarks